Figure 1:
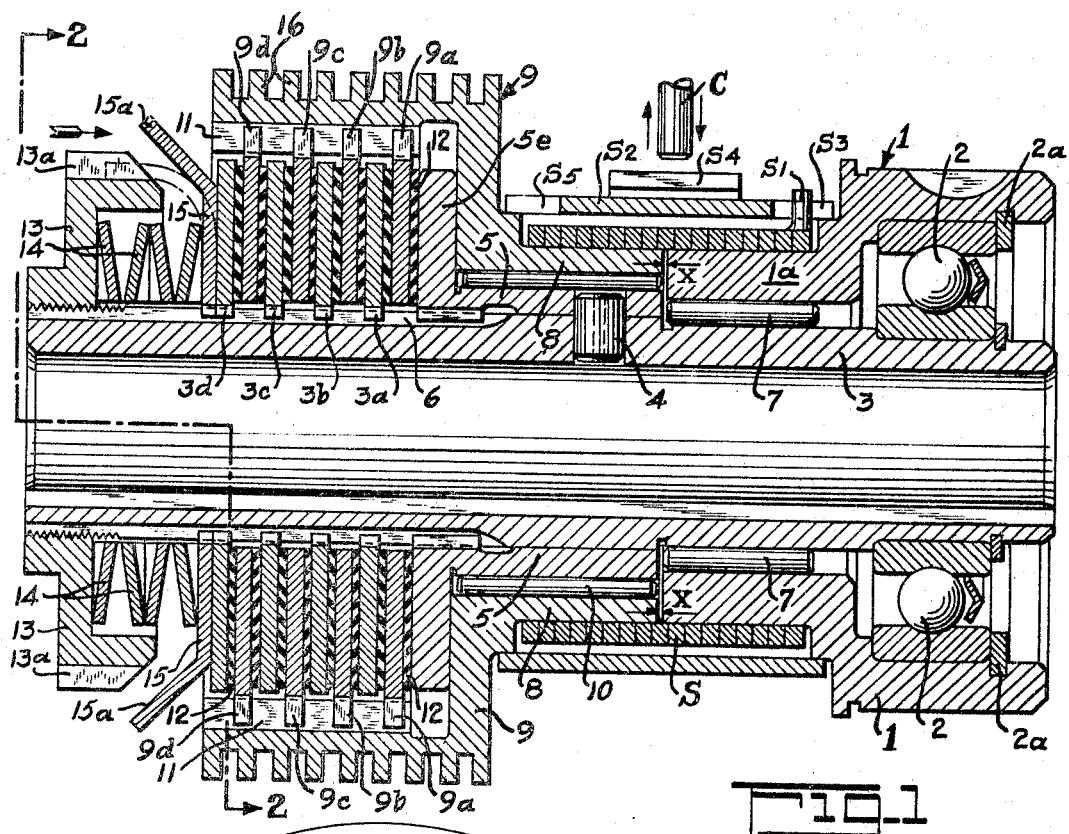

May 16, 1967  C. R. SACCHINI  3,319,751
SPRING CLUTCH AND SLIP COUPLING CONNECTED IN SERIES
Filed March 2, 1965

INVENTOR.
COLUMBUS R. SACCHINI
BY
HIS ATTORNEY

United States Patent Office 3,319,751
Patented May 16, 1967

3,319,751
SPRING CLUTCH AND SLIP COUPLING CONNECTED IN SERIES
Columbus R. Sacchini, Willowick, Ohio, assignor to Curtiss-Wright Corporation, a corporation of Delaware
Filed Mar. 2, 1965, Ser. No. 436,486
7 Claims. (Cl. 192—48)

This invention relates to mechanical clutches, and in particular to an integrated assembly of disk clutch and spring clutch mechanisms for merging the simple and positive control characteristics of the well-known helical spring clutch with the "soft" or more gradual load-pickup characteristics of the disk clutch.

As recognized in the art, the helical spring clutch per se requires but a comparatively small control or triggering force to initiate clutching and declutching. This is done by wrapping and unwrapping, respectively, a helical spring closely coupling two independently mounted clutch members, constituting the driving and driven elements of the spring clutch. The disk clutch per se on the other hand requires a much greater clutch control force for pressing the driving and driven disks into high-friction engagement for transmitting power through the disk clutch. Heavy-duty, high-leverage toggles requiring material application of power are sometimes used for this purpose. However, the helical spring clutch tends to "grab" quickly thereby, in general, limiting its practical high-speed application to pickup of comparatively light loads. The disk clutch by reason of initial slipping between the friction disks upon sudden application of high torque is better adapted for "soft" pickup of heavy loads. In each case, it has been assumed that the driving force is from a constant-speed motor, that can be operated continuously or intermittently.

It has been proposed to combine spring and disk clutches in series for obtaining in a single mechanism the dual advantages noted above. However, prior clutches of this type have, in general, been either too complicated and expensive for most industrial applications, or mechanically unsuited for the many and broad uses required of commercial clutches.

A principal object of this invention therefore is to provide a compact, rugged and comparatively inexpensive spring-disk clutch assembly, that is easily operated by "fingertip" or nominal control force for clutching and declutching only at the spring clutch, and that has a "soft" pickup for capacity loads under both continuous and intermittent operating conditions.

A further and more specific object is an improved spring-disk clutch assembly of optimum over-all length having a minimum number of operating elements and arranged for eliminating the need of expensive metal treating of certain relatively movable parts. The cost of the assembly is thereby materially reduced.

The invention will be more fully set forth in the following description referring to the accompanying drawing, and the features of novelty will be pointed out with particularity in the claims annexed to and forming a part of this specification.

Figure 2:
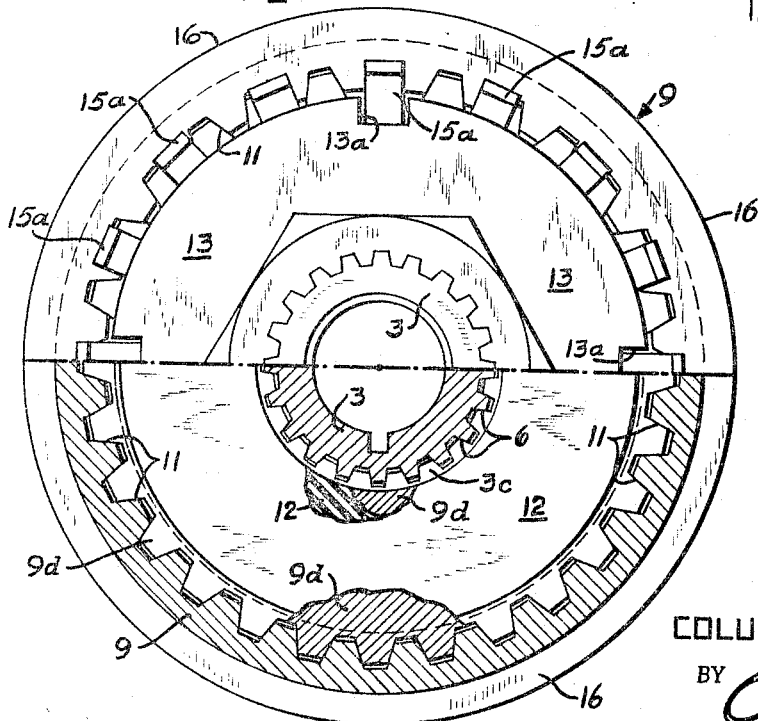

Referring to the drawing:

FIG. 1 is a side view in section, of a spring-disk clutch assembly embodying the present invention, and FIG. 2 is an end view, partly in section, taken along the line 2—2 of FIG. 1.

Referring to FIG. 1, the input power from a driving motor or the like (not shown) is applied to a clutch drive hub 1 that is suitably mounted as by ball bearings 2 and retainer ring $2_a$ on a central output shaft 3. This shaft which constitutes the core of the clutch assembly has pinned thereto at 4 an adapter sleeve 5 on which is rotatably mounted a clutch hub 9 constituting both the driven clutch member of the spring clutch and the driving part of the disk stack of the disk clutch, as hereinafter described. The sleeve 5 also has a flange $5_e$ serving as a back-up disk for the main disk stack.

The drive hub 1 of the spring clutch has a cylindrical sleeve extension $1_a$ that has separate roller bearings 7 between it and the shaft 3 for proper longitudinal support. The extension $1_a$ is in alinement with another cylindrical extension 8 of the aforesaid driven clutch hub 9, that is mounted for rotation on the sleeve 5 by roller bearings 10.

The spring clutch per se may be of conventional form and a brief description will suffice. The cylindrical extensions $1_a$ and 8 are surrounded and bridged for coupling by a compactly wound helical spring S. At one end thereof an offset tongue $S_1$ connects the spring with a control cylinder $S_2$ at the slot $S_3$. This cylinder is freely fitted over the adjoining extension sleeves as indicated, and a detent or tab $S_4$ is fixed on the outer surface thereof in alinement with a vertically movable clutch control element C. The control element is suitably mounted for reciprocal movement and may be operated as desired by a relay, or manually, etc.

When the control element C is above and clears the tab $S_4$ as shown in FIG. 1, the cylinder $S_2$ is freely rotatable with the helical spring S, which in turn is caused to wrap tightly around the sleeve extensions for clutching in well-known manner, assuming that sufficient load is connected to the clutch and input power is applied. The spring relaxes for "overrunning" clutch operation under no-load conditions. When the control element C is lowered to block the tab $S_4$, the cylinder $S_3$ cannot rotate and the spring tongue $S_1$ is held stationary, thereby preventing wrapping or tensioning of the helical spring; this prevents spring coupling of the sleeves $1_a$ and 8 and thus ensures declutching. Where it is desired to apply the input power at the shaft 3, rather than at the hub 1, the cylinder $S_3$ is provided with a slot $S_5$ at its opposite end, so that the helical spring can be reversed in position with the spring tongue inserted in slot $S_5$ for reverse transmission of power and power take-off at the clutch hub 1.

The power pickup and transmission through the disk clutch mechanism may be conventional. The clutch hub 9 has keyed to its inner surface, as by the notches 11, FIG. 2, the spaced drive clutch disks $9_a$, $9_b$, etc. The group of companion or driven disks is keyed directly to the shaft 3. The drive and driven disks are conventionally made of ordinary steel. As shown, FIGS. 1 and 2, the spaced disks $3_a$, $3_b$, etc., are locked against rotation on the shaft by tooth-and-notch connections at 6, in the manner of the drive disks by the tooth-and-notch connections at 11, and are interleaved therewith.

The coacting pairs of interleaved clutch disks $9_a$–$3_a$, $9_b$–$3_b$, etc., are spaced respectively by friction disks 12 that are bonded to the disks $9_a$, $9_b$, etc., and are composed of material having suitable friction qualities, such as brake lining, etc. For load transmission, the disks are pressed together in the direction indicated by an adjusting nut 13 that is threaded on the shaft 3 for increasing or decreasing as desired the tension of four stressed "Belleville" washers 14 seated against a lock washer 15. The nut is tightened to required disk pressure depending on load characteristics and slippage tolerance, etc., after which a peripheral finger $15_a$ of the lock washer is bent into an alined notch $13_a$ of the adjusting nut, thereby locking it in place to maintain constant the bias pressure on the disk stack. Thus, the disk clutch constitutes essentially a torque-limiting and bi-directional shock absorbing device in series with the spring clutch. For dissipating heat generated by relative slipping of the friction disks, the hub 9 may have cooling fins, as indicated at 16.

The assembly described above is especially arranged for economical use of certain parts, ordinarily subject to heavy wear where frequent intermittent operation is required. To this end, the adjacent cylindrical extensions $1_a$ and 5 of the drive hub 1 and sleeve 5, respectively, are axially spaced along the shaft for slight tolerance or clearance at the "cross-over" gap X. This clearance is maintained due to a fixed relation between these parts and the central shaft 3, i.e., the bearing races and retainer ring $2_a$ of the ball bearings 2 prevent axial play of the drive hub 1, and axial movement of the sleeve 5 on the central shaft is prevented by pin 4. Thus, abrasive wear between the end surfaces of the parts $1_a$ and 5 is precluded when the clutch is overrunning or declutched. With this construction, expensive heat-treated parts are not required for the drive hub and adapter sleeve, and cheaper, easily machined parts may be satisfactorily used.

The clutch hub 9 (which carries the drive part of the disk stack) may float within the small tolerance at X, subject to load torque and axial bias pressure of the "Belleville" washers. This slight axial floating of the hub 9 is within the limit establishing the maximum permissible length of the cross-over gap at X. In an operative embodiment of the invention, this maximum is somewhat less than .025 inch. For practical purposes the hub is held in stable axial position by the interleaved clutch disks, and occasional rubbing between the hub extension 8 and the drive hub extension $1_a$ (or the flange $5_e$) is not significant.

It will be apparent that in the construction described above, the cross-over gap X is maintained independently of the spring biasing lock nut 13; that is, if the lock nut were accidentally displaced, the cross-over gap could not lengthen beyond its predetermined safe maximum for causing under high load torque conditions possible distortion of or damage to the helical spring.

It should be understood that this invention is not limited to specific details of construction and arrangement thereof herein illustrated, and that changes and modifications may occur to one skilled in the art without departing from the spirit of the invention.

What I claim is:

1. A clutch assembly comprising a unitary central shaft for connection to a load, a first clutch member directly mounted for free rotation on one end of said shaft for receiving input power, a second clutch member separately mounted for rotation on said shaft in axial alinement with said first clutch member to form therewith a short cross-over gap, said first and second clutch members and the central shaft constituting a compact assembly of optimum over-all length, a helical spring constituting a uni-lateral coupling between said members for transmission of said input power across said gap, selectively operated clutching and declutching means apart from said input member for controlling said helical spring at one end thereof for clutching and declutching the second clutch member with respect to input power, said selectively operative means having alternative means for controlling the helical spring at its opposite end for reversing the direction of power transmission through the clutch assembly, a plurality of spaced friction disks surrounding said shaft and fixed for rotation within said second member, a plurality of companion friction disks fixed for rotation with said shaft and closely interleaved with the aforesaid spaced disks to form a stack and means for applying axially a resilient bias to said stack for urging all said disks into mutual frictional contact for establishing a driving and bi-directional shock absorbing connection between the second clutch member and shaft, said bias determining the maximum torque transmission through the clutch assembly to the shaft-connected load at the opposite end of said shaft.

2. A clutch assembly as specified in claim 1 wherein an adapter sleeve is mounted on the shaft in fixed relation thereto, the second clutch member being in turn rotatably mounted on and axially restrained in one direction by said adapter sleeve, the first clutch member being restrained as to axial movement on the shaft and said adapter sleeve being fixed on said shaft with respect to said first clutch member for limiting the axial length of the spring cross-over gap between the first and second clutch members.

3. A clutch assembly as specified in claim 2 wherein the second clutch member comprises a hub having a materially larger diameter than the shaft with a sleeve extension terminating in close proximity to the first clutch member, said extension rotatably mounted on the adapter sleeve and receiving one end of the coupling clutch spring, and said hub carrying in fixed rotative relation thereto the aforesaid friction disks of the second clutch member.

4. A clutch assembly as specified in claim 2 wherein the adapter sleeve has a lateral flange for the axial restraint of said second clutch member, said flange likewise serving as a friction disk of the shaft-connected disk group.

5. A clutch assembly as specified in claim 4 wherein the second clutch member is mounted for closely limited, floating axial movement between the retaining flange of the adapter sleeve and the first clutch member at the cross-over gap, the respective ends of the second clutch member and adapter sleeve being in substantial radial alinement at the cross-over gap.

6. A clutch assembly as specified in claim 1 wherein the disk biasing means comprises an axially adjustable nut at the corresponding end of the central shaft, a lock washer on the shaft bearing on the disk stack and compressible spring means located between said nut and lock washer, said lock washer having means for interlocking with said nut for maintaining predetermined resilient bias on the disk stack.

7. A compact clutch assembly comprising a central shaft, a spring clutch having relatively movable input and output members mounted on said shaft at one end thereof, a disk clutch having two groups of coacting interleaving disks, connected in series with said spring clutch and mounted on the opposite end of said shaft, the output member of the spring clutch constituting a spring engaged cylindrical portion that is integral with a cylindrical hub of materially larger diameter for enclosing and mounting one of said groups of disks for rotation therewith, the other group of disks being mounted on said shaft for rotation therewith, means for resiliently biasing at all times said groups of disks into high-friction, torque-transmitting contact with each other, and means for controlling said spring clutch for all clutching and declutching operations with respect to transmission of load torque from said spring clutch input member to said shaft.

References Cited by the Examiner

UNITED STATES PATENTS

| | | | |
|---|---|---|---|
| 1,758,173 | 5/1930 | Richards | 192—48 X |
| 2,644,338 | 7/1953 | Miller | 192—48 X |
| 2,725,758 | 12/1955 | Dickey. | |
| 2,930,463 | 3/1960 | Dodge et al. | 192—56 X |
| 2,959,986 | 11/1960 | Irgens et al. | |

References Cited by the Applicant

UNITED STATES PATENTS

| | | |
|---|---|---|
| 1,935,683 | 11/1933 | Wemp. |
| 1,935,684 | 11/1933 | Wemp. |
| 1,962,219 | 6/1934 | Starkey. |
| 2,079,682 | 5/1937 | Chilton. |

BENJAMIN W. WYCHE III, *Primary Examiner.*